United States Patent
Burek

(10) Patent No.: US 8,165,442 B2
(45) Date of Patent: Apr. 24, 2012

(54) SYSTEM FOR SECURING FIBER OPTIC DEVICES IN MANAGEMENT TRAYS

(75) Inventor: Denis E. Burek, Cumming, GA (US)

(73) Assignee: OFS Fitel, LLC, Norcross, GA (US)

( * ) Notice: Subject to any disclaimer, the term of this patent is extended or adjusted under 35 U.S.C. 154(b) by 802 days.

(21) Appl. No.: 12/291,151

(22) Filed: Nov. 6, 2008

(65) Prior Publication Data

US 2010/0111481 A1    May 6, 2010

(51) Int. Cl.
*G02B 6/00* (2006.01)
(52) U.S. Cl. ......................... 385/134; 385/135
(58) Field of Classification Search .................. None
See application file for complete search history.

(56) References Cited

U.S. PATENT DOCUMENTS

| | | | |
|---|---|---|---|
| 3,848,951 A * | 11/1974 | Michaels et al. | 439/357 |
| 4,579,310 A * | 4/1986 | Wells et al. | 248/544 |
| 4,759,600 A * | 7/1988 | Caron et al. | 385/72 |
| 4,999,885 A * | 3/1991 | Lee | 24/586.1 |
| 5,067,784 A | 11/1991 | Debortoli et al. | |
| 5,071,211 A | 12/1991 | Debortoli et al. | |
| 5,127,070 A * | 6/1992 | Blomgren | 385/55 |
| 5,146,532 A * | 9/1992 | Hodge | 385/136 |
| 5,412,751 A | 5/1995 | Siemon et al. | |
| 5,446,822 A | 8/1995 | Keith | |
| 6,364,534 B1 | 4/2002 | Lampert | |
| 6,701,056 B2 * | 3/2004 | Burek et al. | 385/137 |
| 6,901,200 B2 * | 5/2005 | Schray | 385/135 |
| 6,937,807 B2 | 8/2005 | Franklin et al. | |
| 7,310,471 B2 * | 12/2007 | Bayazit et al. | 385/135 |
| 7,373,031 B2 | 5/2008 | Wang et al. | |
| 7,945,136 B2 * | 5/2011 | Cooke et al. | 385/135 |
| 2009/0310927 A1 * | 12/2009 | Riggsby et al. | 385/135 |

FOREIGN PATENT DOCUMENTS

JP    2008-65141 A  *  3/2008

* cited by examiner

*Primary Examiner* — Mike Stahl
(74) *Attorney, Agent, or Firm* — Law Office of Leo Zucker

(57) ABSTRACT

An optical fiber management tray system includes a tray or drawer including a base panel having a number of slots formed in the panel, and a number of retention clips for mounting fiber optic devices of different shapes and dimensions on the panel. Two or more of the clips each has a main body with a different retention portion for enveloping part of a corresponding fiber optic device, and a pair of latch fingers that project from the clip body in the direction of the base panel when the device is enveloped in the retention portion clip and placed at a desired location on the panel. The latch fingers have free ends for engaging edges of the slots in the base panel when the corresponding device is enveloped in the retention clip, thus securing the device at the desired location on the panel.

8 Claims, 4 Drawing Sheets

SYSTEM FOR SECURING FIBER OPTIC DEVICES IN MANAGEMENT TRAYS

BACKGROUND OF THE INVENTION

1. Field of the Invention

This invention concerns fiber management trays or drawers on which fiber optic devices are retained for connection with outside devices or cables.

2. Discussion of the Known Art

Fiber management trays or drawers are disclosed, for example, in U.S. Pat. Nos. 5,412,751 (May 2, 1995) and 6,937,807 (Aug. 30, 2005). The '751 patent discloses a tray for use with a fiber optic patch panel, wherein the tray has apertures for receiving cable ties that serve to restrain movement of a fiber optic cable entering the tray. Pairs of cable retention clips are also provided on the tray to maintain a bundle of coiled fibers extending from the cable within a certain range of bending radii, before the fibers are terminated at a front panel for connection with outside cables.

The '807 patent discloses a sliding drawer for a cable management panel. At least two drop-in plates are mounted in the drawer, wherein the plates accommodate selected fiber components, e.g., attenuators, couplers, filters, multiplexers and splitters. The patent does not disclose specific details concerning the retention or mounting of the components on the drop-in plates, however. Fiber management trays with hold down fingers that are molded onto the tray surface are also known, wherein fibers or associated components are urged between adjacent fingers and are thereby retained on the tray.

U.S. Pat. No. 5,067,784 (Nov. 26, 1991) and U.S. Pat. No. 5,071,211 (Dec. 10, 1991) describe connector holders or mounts for optical fibers. The mounts are accommodated in a recess formed in the base of a tray, and a foot at the front of each mount is inserted through an opening defined in a front side of the recess. A flexible latch at the rear of each mount is received through a hole in the rear side of the recess and serves to hold the mount in position, according to the patents. See also U.S. Pat. No. 5,446,822 (Aug. 29, 1995), and U.S. Pat. No. 7,373,031 (May 13, 2008).

It would be desirable for a single fiber management tray or drawer to be able to accommodate two or more fiber optic devices of different exterior dimensions and shapes, at such positions and orientations that will best suit the type and amount of fiber routed to and from the tray within an associated network node enclosure. Such devices include, for example, filters or splitters; coarse wavelength division multiplexing (CWDM), dense wavelength division multiplexing (DWDM), and O band cassettes; and SC or other types of cable connector adapters.

SUMMARY OF THE INVENTION

According to the invention, an optical fiber management tray system includes a tray or drawer including a base panel having a number of slots formed in the panel, and a number of retention clips for mounting fiber optic devices of different exterior shapes and dimensions on the base panel. Two or more of the retention clips each has a main body with a different retention portion for enveloping at least part of a corresponding fiber optic device, and a pair of latch fingers projecting from the body in the direction of the base panel when the device is enveloped in the retention portion and placed at a desired location on the panel. The latch fingers have free ends formed to engage edges of the slots in the base panel when the corresponding device is enveloped in the clip, thus securing the device at the desired location on the panel.

According to another aspect of the invention, a kit of retention clips for mounting different fiber optic devices on a base panel having a number of slots formed in the panel, includes a number of retention clips for mounting fiber optic devices of different exterior shapes and dimensions on the base panel. Two or more of the clips each has a main body with a different retention portion for enveloping at least part of a corresponding fiber optic device, and a pair of latch fingers that project from the body of the clip in the direction of the base panel when the device is enveloped in the retention portion and placed at a desired location on the panel. The latch fingers have free ends arranged to engage a selected pair of slots in the panel when the corresponding device is enveloped in the retention clip, for securing the device at the desired location on the panel.

For a better understanding of the invention, reference is made to the following description taken in conjunction with the accompanying drawing and the appended claims.

DETAILED DESCRIPTION OF THE INVENTION

Figure 1:
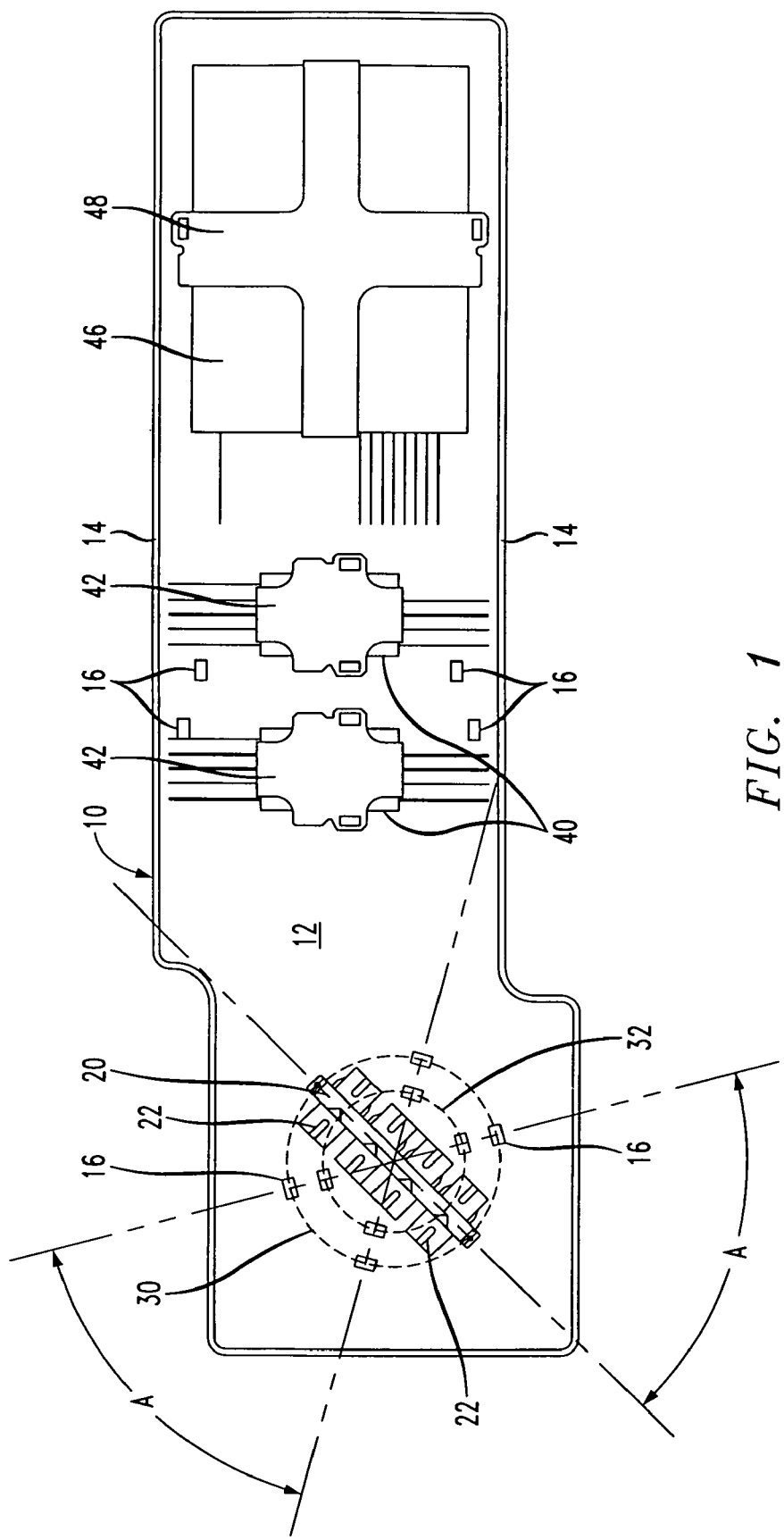
FIG. 1 is a plan view of a fiber management tray showing fiber optic devices mounted on the tray with retaining clips, according to the invention.

FIG. 1 is a plan view of a fiber management tray 10, according to the invention. The tray 10 has a substantially flat base wall or panel 12, and a side wall 14 that may rise a certain height above the panel 12 from the perimeter of the panel 12. While not shown in the drawing, the tray 10 may also have tabs or other parts to hold and/or lock the tray 10 in proximity to associated fiber optic network equipment, and/or to secure a tray cover in order to protect cables and devices mounted on the tray.

The base panel 12 has a number of slots 16 formed in areas of the panel where fiber optic components or devices are to be mounted. The slots 16 may also be formed near the side wall 14 (see middle of FIG. 1) and in other areas of the panel 12 for engaging cable clips and guides.

FIG. 1 illustrates three different types of fiber optic devices mounted on the base panel 12 of the tray 10 using retention clips according to the invention. Specifically, a retention clip 20 is shown for mounting four cable connector adapters 22

Figure 2:
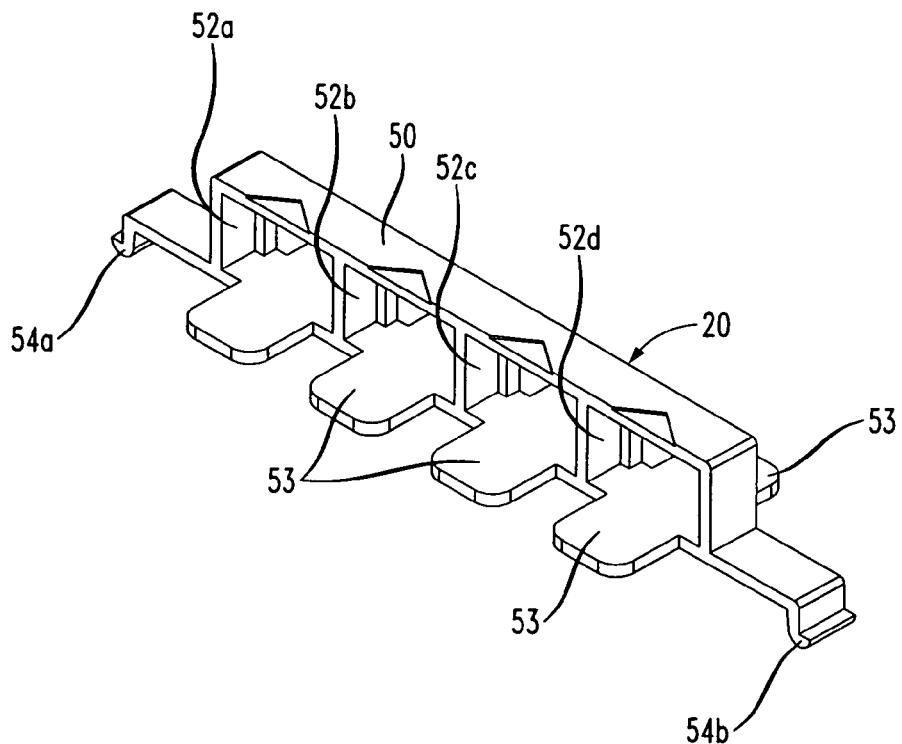
FIG. 2 is an enlarged perspective view of a retaining clip shown in FIG. 1, for mounting four fiber optic cable connector adapters on the tray according to the invention.

(e.g., type SC) at the left in FIG. 1. FIG. 2 is an enlarged perspective view of the retention clip 20 alone, i.e., absent the adapters 22.

In FIG. 1, two arrays 30, 32 of the slots 16 are formed in circular patterns at the left of the tray panel 12, wherein the slots of each array are equi-circumferentially spaced from one another by an angle A of, e.g., 60°. In the illustrated embodiment, the two arrays 30, 32 are concentric with one another, and a given slot of one array is disposed on the same radius as a corresponding slot of the other array. Further, the diameters of the slot arrays 30, 32 are set to correspond to distances between pairs of latch fingers (described below) provided on the inventive retention clips. For example, the diameter of the outer slot array 30 in FIG. 1 is set so that latch fingers at opposite side ends of the first retention clip 20 (see FIG. 2) can engage a selected pair of diametrically opposed slots 16 of the array 30.

FIG. 1 also shows two CWDM cassettes 40 mounted on the base panel 12 of the tray 10 by way of retention clips 42 according to the invention, and a DWDM cassette 46 mounted on the panel 12 via a retention clip 48 according to the invention. See FIGS. 6 and 7 and related descriptions below.

FIG. 2 is an enlarged view of the retention clip 20 in FIG. 1. The clip 20 has a main body in the form of an elongated, generally rectangular frame. A retention portion 50 of the main body forms four rectangular openings 52a, 52b, 52c and 52d within which the connector adapters 22 in FIG. 1 are press fit or otherwise securely enveloped in the retention portion 50. Tabs 53 project outward at the bottom of each opening 52a-52d on both sides of the clip 20, to guide and support the connector adapters 22 when inserted into or withdrawn from the openings. A pair of latch fingers 54a, 54b project downward from opposite side ends of the clip body as shown in FIG. 2. The retention clip 20 including the retention portion 50, the tabs 53 and the latch fingers 54a, 54b, may be molded integrally from a plastics material such as, e.g., Lexan® 141 or equivalent.

Each of the latch fingers 54a, 54b of the clip 20 may be, e.g., about ¼" wide have a generally "L" shaped or hook-like cross section. The distal or free end surfaces of the fingers are preferably formed with a radius of curvature of about 0.060 inches so that when pressed into a selected pair of the slots 16 in the tray panel 12, the fingers are urged smoothly to deflect toward one another. When the distal ends of the fingers emerge from the slots beneath the panel 12, they resume their original configuration and engage or hook corresponding edges of the slots so that the clip 20 secures the connector adapters 22 atop the panel 12 when the adapters are enveloped in the retention portion 50 of the clip.

In the present embodiment, the latch fingers 54a, 54b of the retention clip 20 are spaced apart by a distance of about 3.750 inches, to correspond with the spacing between each pair of diametrically opposed slots 16 of the array 30 in the tray base panel 12 in FIG. 1. It will be understood, however, that other pairs of slots may be formed at desired locations on the panel 12 and with such spacing as to allow the latch fingers 54a, 54b of the clip 20 to be received in and engage the slots. Moreover, such other pairs of slots need not be arrayed in any defined geometric pattern(s).

Figure 3:
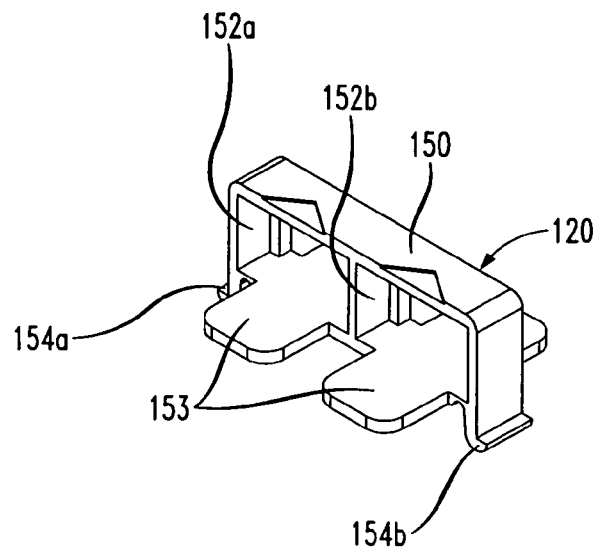
FIG. 3 is a perspective view of a retaining clip for mounting two connector adapters on the tray according to the invention.

FIG. 3 is a view of a retention clip 120 according to the invention. Parts similar or identical to those of the retention clip 20 in FIG. 2 have corresponding reference numerals increased by 100. The clip 120 also has a main body in the form of an elongated, generally rectangular frame. A retention portion 150 of the main body forms two rectangular openings 152a, 152b, within which connector adapters the same or similar to the adapters 22 in FIG. 1 may be enveloped and secured by friction or equivalent means. Tabs 153 project outward at the bottom of each opening 152a, 152b on both sides of the clip 120, to guide and support the connector adapters when inserted into or withdrawn from the openings. A pair of latch fingers 154a, 154b project downward from opposite side ends of the clip body as shown in FIG. 3. The retention clip 120 including the retention portion 150, the tabs 153 and the latch fingers 154a, 154b, may be molded integrally from a plastics material such as, e.g., Lexan® 141 or equivalent.

Each of the latch fingers 154a, 154b of the clip 120 may be, e.g., about ¼" wide have a generally "L" shaped or hook-like cross section. The distal end surfaces of the fingers are preferably formed with a radius of curvature of about 0.060 inches so that when pressed into a selected pair of the slots 16 in the tray panel 12, the fingers are urged smoothly to deflect toward one another. When the distal ends of the fingers emerge from the slots beneath the panel 12, they resume their original configuration and engage or hook corresponding edges of the slots so that the clip 120 secures the connector adapters 22 atop the panel 12 when the adapters are enveloped in the retention portion 150 of the clip.

The latch fingers 154a, 154b of the retention clip 120 in FIG. 3 may be spaced apart by a distance of about 1.375 inches, to correspond with the spacing between each pair of diametrically opposed slots 16 of the array 32 in the tray base panel 12 in FIG. 1. It will be understood, however, that other pairs of slots may be formed at desired locations on the panel 12 and with such spacing as to allow the latch fingers 154a, 154b of the clip 120 to be received in and engage the slots. Moreover, such other pairs of slots need not be arrayed in any particular geometric pattern(s).

Figure 4:
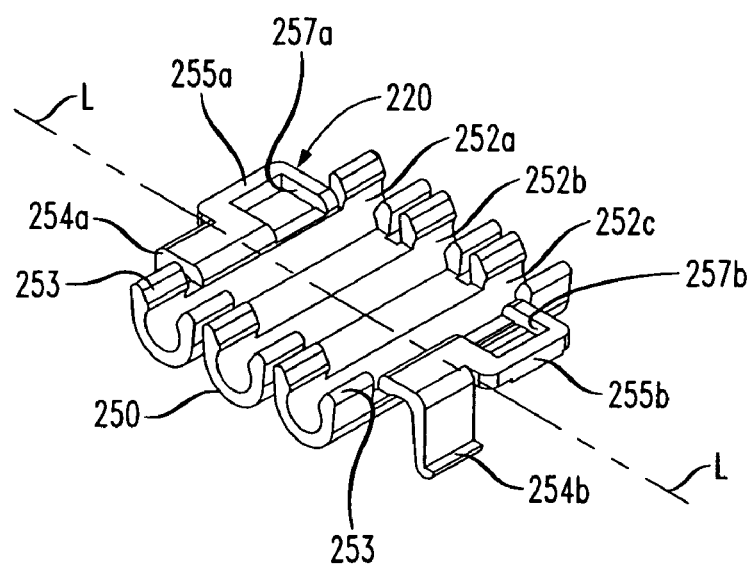
FIG. 4 is a perspective view of a retaining clip for mounting up to three raw filters or splitters on the tray according to the invention.

FIG. 4 is a view of another retention clip 220 according to the invention. Parts corresponding in function to certain parts of the retention clip 20 in FIG. 2, have the same reference numerals increased by 200. The clip 220 also has a main body with a retention portion 250 that forms three channels 252a, 252b and 252c aligned axially parallel with one another. Each channel has an arcuate interior surface on which a fiber optic device 300 (see FIG. 5) having a cylindrical exterior (e.g., a raw filter or splitter measuring 5 mm dia.x36 mm long) can be partially enveloped, and pairs of opposed tabs 253 at each end of the channel for retaining the device by clamping against the device body. A pair of latch fingers 254a, 254b project downward from opposite side ends of the clip body as shown in FIG. 4.

Each of the latch fingers 254a, 254b of the clip 220 in FIG. 4 may be, e.g., about ¼" wide and have a generally "L"-shaped or hook-like cross section. The distal end surfaces of the fingers are preferably formed with a radius of curvature of about 0.060 inches so that when pressed into certain pairs of the slots 16 in the tray base panel 12, the fingers are urged smoothly to deflect toward one another. When the distal ends of the fingers emerge from the slots beneath the panel 12, they will snap apart to engage or hook the edges of the slots so that the clip 220 secures the retained filter or splitter device(s) 300 atop the panel 12.

The latch fingers 254a, 254b of the retention clip 220 in FIG. 4 may be spaced apart by a distance of about 1.375 inches, to correspond with the spacing between each pair of diametrically opposed slots 16 of the array 32 in the tray base panel 12 in FIG. 1. It will be understood, however, that other pairs of slots may be formed at desired locations on the panel 12 and with such spacing as to allow the latch fingers 254a, 254b of the clip 220 to be received in and engage the slots.

Moreover, such other pairs of slots need not be arrayed in any particular geometric pattern(s).

Figure 5:
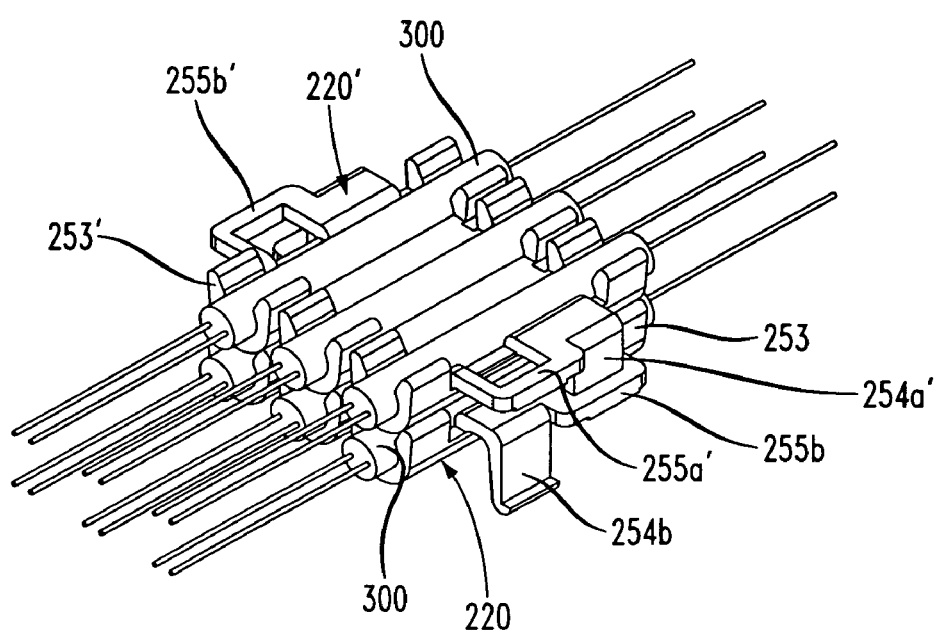
FIG. 5 is a perspective view showing two of the inventive retaining clips of FIG. 4 fastened to one another for mounting up to six filters or splitters on the tray.

The main body of the retention clip 220 in FIG. 4 has a long axis L-L and, in the illustrated embodiment, the latch fingers 254a, 254b are disposed on the same side of the axis L-L. The clip 220 also has a pair of ears 255a, 255b each of which is formed next to a corresponding one of the latch fingers 254a, 254b, and on the side of axis L-L opposite the latch fingers. The ears 255a, 255b on the retention clip 220 form slot openings 257a, 257b that are dimensioned to receive and engage corresponding latch fingers 254b', 254a' of another like retention clip 220', as illustrated in FIG. 5. Thus, two or more of the retention clips 220 may be stacked and interlocked with one another if more than three of the fiber optic devices 300 in FIG. 5 need to be mounted at a common location on the base panel 12 of the management tray 10. In such a case, the latch fingers 254a, 254b of the bottommost retention clip 220 would engage a pair of slots 16 having the proper spacing at the desired location, and each remaining clip of the stack will be anchored at the location by way of the bottommost and any intermediate ones of the retention clips 220. The retention clip 220 including the retention portion 250, the tabs 253 the latch fingers 254a, 254b, and the ears 255a, 255b may all be molded integrally from a plastics material such as, e.g., Lexan® 141 or equivalent.

Figure 6:
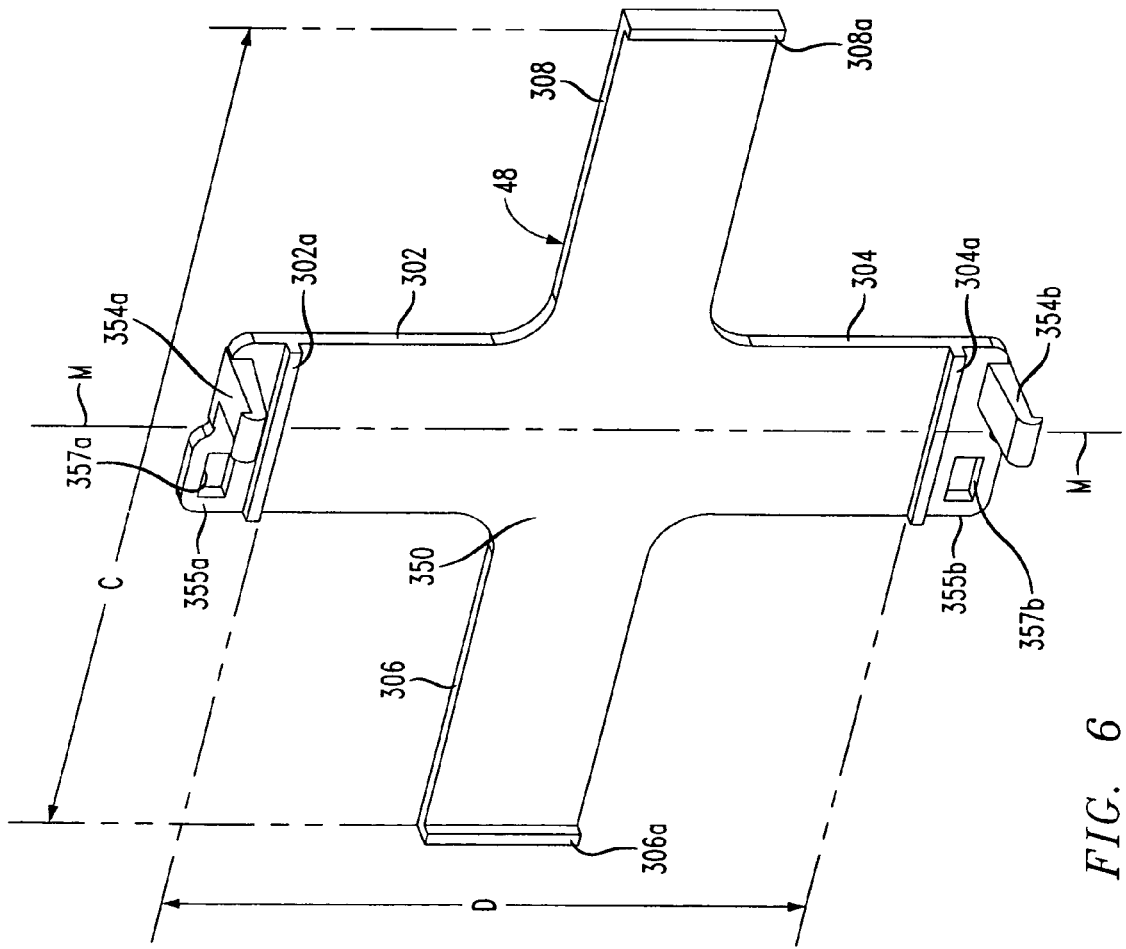
FIG. 6 is a perspective view of a retaining clip shown in FIG. 1 for mounting an O band or a DWDM cassette on the tray, according to the invention.

FIG. 6 is an enlarged view of the retention clip 48 in FIG. 1 as seen from the bottom of the clip. The clip 48 has a main body with four arms 302, 304, 306, 308 in the form of a generally flat cross. Each of the arms has a stop or bar 302a, 304a, 306a, 308a formed on the bottom surface of the arm at or near the arm's free end. The four arms 302, 304, 306, 308 and their associated stops define a retention portion 350 of the clip body. The retention portion 350 of the clip 48 in FIG. 6 extends over an area of sufficient length C and width D to envelop the exterior perimeter of, for example, the 1×8 DWDM cassette 46 in FIG. 1 whose typical dimensions are, e.g., 126 mm long×93 mm wide×10 mm high.

A pair of latch fingers 354a, 354b project downward from opposite free ends of the clip body arms 302, 304. Each of the latch fingers 354a, 354b of the retention clip 48 may be, e.g., about ¼" wide have a generally "L" shaped or hook-like cross section. The distal end surfaces of the fingers are preferably formed with a radius of curvature of about 0.060 inch so that when pressed into a selected pair of the slots 16 in the base panel 12 of the management tray 10, the fingers are urged smoothly to deflect toward one another. When the distal ends of the fingers emerge from the slots beneath the panel 12, they resume their original configuration and engage or hook corresponding edges of the slots so that the clip 48 will secure the cassette 46 atop the panel 12 when the cassette is enveloped by the retention portion 350 of the clip. The stops 302a-308a are preferably located on the bottom surface of the arms 302-308 of the clip 48 so that the stops extend just outside the perimeter of the cassette 46, thus preventing the cassette from sliding out from under the arms after the clip 48 is set in place on the panel 12.

The lengths of the latch fingers 354a, 354b preferably correspond to the height of the cassette 46 or other planar optical device to be retained by the clip 48. For the cassette 46 having a typical height of 10 mm, the length of the latch fingers measured from beneath the arms 302, 304 and excluding the hooked distal end of each finger, should be slightly greater than the height of the cassette, e.g., about 0.408 inch (10.36 mm) to accommodate the thickness of the base panel 12 of the tray 10. The latch fingers 354a, 354b of the retention clip 48 in FIG. 6 may be spaced apart by a distance of, e.g., 3.775 inches (99.89 mm) to accommodate the width of the cassette 46 (typically 93 mm). A pair of correspondingly spaced slots 16 should therefore be formed in the base panel 12 in the region of the panel where the cassette 46 is expected to be mounted.

The latch fingers 354a, 354b of the retention clip 48 in FIG. 6 are disposed on the same side of an axis M-M that extends medially of the arms 302, 304 of the clip body. The clip 48 also has a pair of ears 355a, 355b each of which is formed next to a corresponding one of the latch fingers 354a, 354b, and on the side of axis M-M opposite the latch fingers. The ears 355a, 355b on the retention clip 48 form slot openings 357a, 357b that are dimensioned to receive and engage corresponding latch fingers of another like retention clip (not shown). Thus, two or more of the retention clips 48 may be stacked and interlocked with one another if more than one of the cassettes 46 in FIG. 1 are to be mounted at a common location on the base panel 12 of the management tray 10. In such a case, the latch fingers 354a, 354b of the bottommost retention clip 48 would engage a pair of panel slots 16 having the proper spacing at the desired location, and all remaining clips of the stack will each be anchored at the location by the bottommost and any intermediate ones of the retention clips 48. The retention clip 48 including the retention portion 350, the latch fingers 354a, 354b, and the ears 355a, 355b may all be molded integrally from a plastics material such as, e.g., Lexan® 141 or equivalent.

Figure 7:
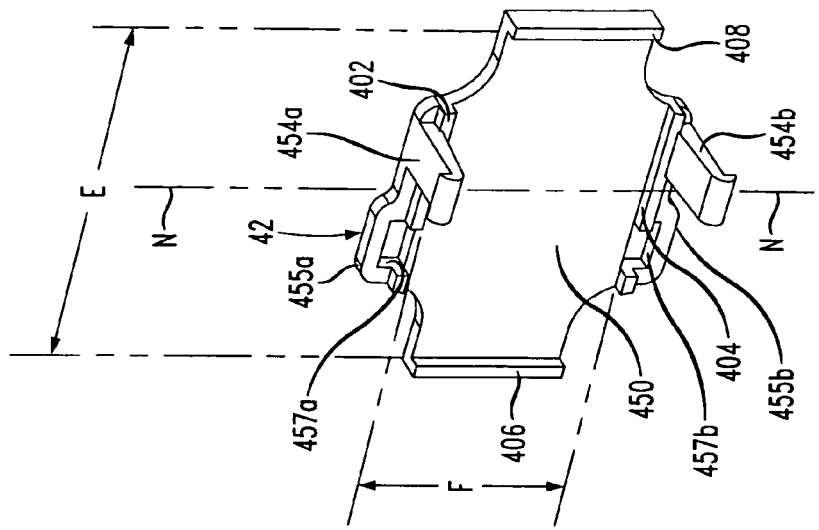
FIG. 7 is a perspective view of a retaining clip shown in FIG. 1 for mounting a CWDM cassette on the tray according to the invention.

FIG. 7 is an enlarged view of the retention clip 42 in FIG. 1 as seen from the bottom of the clip. The clip 42 has a generally flat rectangular main body with stops or bars 402, 404, 406, 408 formed on the bottom surface of the clip body at or near each side edge of the body. The clip body including the stops define a retention portion 450 that extends over an area of sufficient length E and width F to envelop the exterior perimeter of, for example, the 1×8 CWDM cassette 40 in FIG. 1 whose typical dimensions are, e.g., 46.7 mm long×27.9 mm wide×8.6 mm high.

A pair of latch fingers 454a, 454b project downward from the long side edges of the clip body. Each of the latch fingers 454a, 454b of the retention clip 42 may be, e.g., about ¼" wide have a generally "L" shaped or hook-like cross section. The distal end surfaces of the fingers are preferably formed with a radius of curvature of about 0.059 inch so that when pressed into a selected pair of the slots 16 in the base panel 12 of the management tray 10, the fingers are urged smoothly to deflect toward one another. When the distal ends of the fingers emerge from the slots beneath the panel 12, they resume their original configuration and engage or hook corresponding edges of the slots so that the clip 42 will secure the cassette 40 atop the panel 12 with the cassette enveloped in the retention portion 450 of the clip. The stops 402-408 are preferably located on the bottom surface of the clip body so that they extend just outside the perimeter of the cassette 40, thus preventing the cassette from sliding out from beneath the clip 42 after the clip is set in place on the panel 12.

The lengths of the latch fingers 454a, 454b preferably correspond to the height of the cassette 40 or other planar optical device to be retained by the clip 42. For the cassette 40 having a typical height of 8.6 mm, the length of the latch fingers measured from the bottom surface of the clip body and excluding the hooked distal end of each finger, should be slightly greater than the height of the cassette, e.g., about 0.356 inch (9.04 mm) to accommodate the thickness of the base panel 12 of the tray 10. The latch fingers 454a, 454b of the retention clip 42 in FIG. 7 may be spaced apart by a distance of, e.g., 1.375 inches (34.93 mm) to accommodate the width of the cassette 46 (typically 27.9 mm). A pair of correspondingly spaced slots 16 should therefore be formed in the base panel 12 in the region of the panel where the cassette 40 is expected to be mounted.

The latch fingers 454a, 454b of the retention clip 42 in FIG. 7 are disposed on the same side of an axis N-N that extends medially between the short sides of the clip body. The clip 42 also has a pair of ears 455a, 455b each of which is formed next to a corresponding one of the latch fingers 454a, 454b, and on the side of axis N-N opposite the latch fingers. The ears 455a, 455b on the retention clip 42 form slot openings 457a, 457b that are dimensioned to receive and engage corresponding latch fingers of another like retention clip (not shown). Thus, two or more of the retention clips 42 may be stacked and interlocked with one another if more than one of the cassettes 40 in FIG. 1 are to be mounted at a common location on the base panel 12 of the management tray 10. In such a case, the latch fingers 454a, 454b of the bottommost retention clip 42 would engage a pair of panel slots 16 having the proper spacing at the desired location, and all remaining clips of the stack will each be anchored at the location by the bottommost and any intermediate ones of the retention clips 42. The retention clip 42 including the retention portion 450, the latch fingers 454a, 454b, and the ears 455a, 455b may all be molded integrally from a plastics material such as, e.g., Lexan® 141 or equivalent.

As disclosed herein, the inventive system features retention clips that are constructed and arranged for mounting two or more optical devices or adapters having different exterior dimensions, all on a single management tray in which slots are formed at determined locations for engaging the clips. The system enables each device to be fastened securely to the tray without having to mold a number of hold down fingers on the tray. That is, the tray can have a smooth, flat surface and yet be capable of mounting a variety of fiber optic devices in an optimal configuration.

While the foregoing represents preferred embodiments of the invention, it will be understood by those skilled in the art that various modifications and changes may be made without departing from the spirit and scope of the invention. For example, instead of or in addition to spaced pairs of the slots 16, the base panel 12 of the tray may have one or more elongated slots of such length that opposite edges of a single slot may engage or hook both of the latch fingers of certain ones of the retention clips. Accordingly, the invention includes all such modifications and changes as come within the bounds of the following claims.

I claim:

1. An optical fiber management tray system, comprising:
    a tray or drawer including a base panel having a number of slots formed in the panel at determined locations;
    a number of retention clips for mounting fiber optic devices of different exterior shapes and dimensions on the base panel;
    two or more of the retention clips each has a main body with a different retention portion for enveloping at least part of a corresponding fiber optic device, and a pair of spaced latch fingers arranged to project from the body of the clip in the direction of the base panel when the device is enveloped in the retention portion of the clip and placed at a desired location on the panel; and
    the latch fingers of each retention clip have free ends formed to engage edges of one or more of the slots in the base panel at the desired location when the corresponding device is enveloped in the retention clip, thus securing the device at the desired location on the panel;
    wherein the main body of at least one of the retention clips has a pair of ears each of which is formed next to a corresponding one of the latch fingers, and the ears form slot openings dimensioned to receive and engage corresponding latch fingers of another one of the retention clips.

2. A kit of retention clips for mounting a number of different fiber optic devices on a base panel having a number of slots formed in the panel at determined locations, comprising:
    a number of retention clips for mounting fiber optic devices of different exterior shapes and dimensions on the base panel;
    two or more of the retention clips each has a main body with a different retention portion for enveloping at least part of a corresponding fiber optic device, and a pair of spaced latch fingers arranged to project from the body of the clip in the direction of the base panel when the device is enveloped in the retention portion of the clip and placed at a desired location on the panel; and
    the latch fingers of each retention clip have free ends formed to engage edges of one or more of the slots in the base panel at the desired location when the corresponding device is enveloped in the retention clip, thus securing the device at the desired location on the panel;
    wherein the main body of at least one of the retention clips has a pair of ears each of which is formed next to a corresponding one of the latch fingers, and the ears form slot openings dimensioned to receive and engage corresponding latch fingers of another one of the retention clips.

3. A retention clip, comprising:
    a generally rectangular flat main body having stops or bars each formed on a bottom surface of the body in the region of a corresponding side edge of the body, wherein the main body including the stops or bars define a retention portion that extends over an area sufficient to envelop an exterior perimeter of a network device;
    a pair of latch fingers projecting downward from a pair of opposite side edges of the main body, wherein each latch finger has a generally L-shaped cross section, and distal end surfaces of the fingers are formed so that when each finger is pressed into a slot in a base panel, the finger engages an edge of the slot and the clip secures a network device enveloped by the retention portion of the main body atop the base panel; and
    wherein the main body has an axis and the pair of latch fingers are disposed both on the same side of the axis, a pair of ears are each formed next to a corresponding one of the latch fingers on the side of the axis opposite the latch fingers, and the ears form slot openings dimensioned to receive and engage corresponding latch fingers of another like retention clip so that two or more of the retention clips can be stacked and interlocked with one another.

4. An optical fiber management tray system according to claim 1, wherein the latch fingers have a generally L-shaped cross section, and free end surfaces of the fingers have a radius of curvature of about 0.060 inch.

5. A kit of retention clips according to claim 3, wherein the latch fingers have a generally L-shaped cross section, and free end surfaces of the fingers have a radius of curvature of about 0.060 inch.

6. A retention clip according to claim 3, wherein the latch fingers have a generally L-shaped cross section, and free end surfaces of the fingers have a radius of curvature of about 0.060 inch.

7. An optical fiber management tray system according to claim 1, wherein the retention portions of the bodies of said two or more retention clips are configured to envelop fiber optic devices selected from the group comprising connector adapters, filters, splitters, and cassettes.

8. A kit of retention clips according to claim 2, wherein the retention portions of the bodies of said two or more retention clips are configured to envelop fiber optic devices selected from the group comprising connector adapters, filters, splitters, and cassettes.

* * * * *